US011668363B2

(12) United States Patent
Moline (10) Patent No.: US 11,668,363 B2
(45) Date of Patent: Jun. 6, 2023

(54) AIRCRAFT WHEEL PROVIDED WITH HEAT SHIELDS

(71) Applicant: SAFRAN LANDING SYSTEMS, Velizy Villacoublay (FR)

(72) Inventor: Sylvain Moline, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 456 days.

(21) Appl. No.: 16/802,911

(22) Filed: Feb. 27, 2020

(65) Prior Publication Data
US 2020/0278005 A1 Sep. 3, 2020

(30) Foreign Application Priority Data

Feb. 28, 2019 (FR) ...................................... 1902060

(51) Int. Cl.
*F16D 65/78* (2006.01)
*F16D 65/847* (2006.01)
*B60B 27/00* (2006.01)
*B64C 25/36* (2006.01)
*F16D 55/36* (2006.01)

(52) U.S. Cl.
CPC ........ *F16D 65/847* (2013.01); *B60B 27/0052* (2013.01); *B64C 25/36* (2013.01); *F16D 55/36* (2013.01); *F16D 2065/785* (2013.01)

(58) Field of Classification Search
CPC ......... B60C 23/18; B60C 23/36; B64C 25/36; F16D 55/36; F16D 65/847; F16D 2065/785; B60B 27/0052
USPC .... 188/71.5, 71.6, 264 G; 301/6.2, 6.3, 6.91
See application file for complete search history.

(56) References Cited

U.S. PATENT DOCUMENTS

| 3,051,528 | A | * | 8/1962 | Rogers | ................... | B60C 23/18 |
| | | | | | | 188/264 G |
| 4,017,123 | A | * | 4/1977 | Horner | ................... | B60C 23/18 |
| | | | | | | 188/264 G |
| 4,856,619 | A | * | 8/1989 | Petersen | ................. | B64C 25/36 |
| | | | | | | 188/71.6 |
| 7,051,845 | B2 | * | 5/2006 | Thorp | ................... | F16D 65/78 |
| | | | | | | 188/71.6 |

(Continued)

FOREIGN PATENT DOCUMENTS

CN 206579836 U 10/2017

OTHER PUBLICATIONS

Search report for France Application No. 1902060 dated Jan. 10, 2020.

*Primary Examiner* — Christopher P Schwartz
(74) *Attorney, Agent, or Firm* — Sughrue Mion, PLLC (57) ABSTRACT

An aircraft wheel (1) comprising a hub connected to a rim (3) provided with a tire (100), the hub having an outer surface that extends facing an inner surface (4) of the rim (3) and that co-operates therewith to define an annular space for receiving a stack of brake disks including rotor disks having axial peripheral notches, each notch receiving a segment of an axial bar (10) extending projecting from the inner surface (4) of the rim (3), and respective heat shields (20), each in the form of an annular segment, being mounted between the two bars (10) of respective pairs of adjacent bars. Each heat shield (20) includes at least one holder portion bearing against at least one first abutment (19, 119) secured to the rim (3) in order to hold the heat shield (20) in position on the rim (3) elastically.

10 Claims, 6 Drawing Sheets

(56) References Cited

U.S. PATENT DOCUMENTS

| | | | |
|---|---|---|---|
| 9,718,317 B2* | 8/2017 | Kendricks | B64C 25/34 |
| 11,346,418 B2* | 5/2022 | Francis | B60T 8/1703 |
| 2009/0071763 A1 | 3/2009 | Thorp et al. | |
| 2010/0025172 A1* | 2/2010 | Campbell | F16D 65/12 |
| | | | 188/264 G |

* cited by examiner

AIRCRAFT WHEEL PROVIDED WITH HEAT SHIELDS

The present invention relates to the field of vehicles, and more particularly to the field of aircraft provided with wheeled landing gear.

TECHNOLOGICAL BACKGROUND

An aircraft wheel conventionally comprises a hub connected by a disk to a rim provided with a tire. The hub has an outer surface that extends facing an inner surface of the rim and that co-operates therewith to define an annular space for receiving a stack of brake disks. The stack includes brake disks that are referred to as "rotor disks" and that include axial peripheral notches for receiving portions of axial bars, each of which is secured to a respective wheel spline projecting from the inner surface of the rim in order to constrain the stack of rotor disks to rotate with the rim.

Each of the bars is trough-shaped and is engaged on its wheel spline, being fastened thereto by screws engaged in the wheel spline through the bar. Between the two bars of each pair of adjacent bars, there is mounted a heat shield in the form of an annular segment that is fastened to the rim by means of screws engaged in tapped holes formed in the ends of the bars.

Nevertheless, certain wheels are provided with a ring that carries obstacles for co-operating with gearing that is driven in rotation by a gear motor. It is known, in particular from Document FR-A-3 022 216, to fasten said ring to the rim by means of screws engaged in the above-mentioned holes, which are then no longer available in simple manner for use in fastening heat shields.

OBJECT OF THE INVENTION

One of the objects of the invention is to facilitate fastening heat shields.

BRIEF SUMMARY OF THE INVENTION

To this end, the invention provides an aircraft wheel provided with a hub connected to a rim provided with a tire. The hub has an outer surface that extends facing an inner surface of the rim and that co-operates therewith to define an annular space for receiving a stack of brake disks including rotor disks having axial peripheral notches, each notch receiving a segment of an axial bar extending projecting from the inner surface of the rim. Respective heat shields, each in the form of an annular segment, are mounted between the two bars of respective pairs of adjacent bars. Each heat shield includes at least one holder portion bearing against at least one first abutment secured to the rim in order to hold the heat shield in position on the rim elastically.

Thus, the heat shields are fastened by elastic holder means formed by the holder portion and by the holder abutment, which may be arranged to be used without requiring an operator to act on them directly.

According to a particular characteristic, each bar has a longitudinal edge defining at least a portion of a groove receiving an edge of the heat shield.

Under such circumstances and advantageously, the groove has an open end opening out into an annular edge of the rim in order to enable the edge of the heat shield to be inserted parallel to the bar, and the first abutment extends projecting in the vicinity of the open end of the groove so as to leave a passage for inserting the edge of the heat shield into the groove.

The heat shield is put into place by being moved in translation parallel to the flanks of the groove, which flanks serve to hold the heat shield in a radial direction, while the first abutment opposes the heat shield moving out from the groove and thus holds it axially.

Preferably, the heat shield includes a raised projection that is elastically deformable under a force is substantially normal to the heat shield so that a portion of the heat shield adjacent to the raised projection bears against the first abutment in order to oppose extraction of the heat shield from the groove while being elastically deformable towards a flattened state in which the heat shield portion adjacent to the raised projection can escape from the first abutment.

The elastic holder means then present a structure that is particularly simple.

According to advantageous characteristics, which may optionally be combined with one another:
- the first abutment is formed by a tab of the bar;
- the bar has an edge extending facing a portion of the rim to co-operate therewith to define the groove; and
- remote from its open end, the bar includes an end that is closed, at least in part, by a tab of the bar.

In a preferred embodiment of the invention, the holder portion and the first abutment are arranged to be put into engagement while the heat shield is moving substantially radially relative to the rim.

Under such circumstances and advantageously, the wheel includes second abutments, each arranged in the vicinity of one of the ends of each bar remote from the first abutment and on at least one side of said bar in order to form a bearing surface against which an edge of the heat shield can bear.

Also advantageously, each second abutment is arranged to allow the opposite edge of the heat shield to pivot between an assembly position in which the heat shield slopes relative to the rim and a utilization position in which the heat shield extends parallel to the rim and its holder portion co-operating with the first abutment, the holder portion and the first abutment being arranged to allow the heat shield to pivot from the assembly position towards the utilization position and to oppose pivoting of the heat shield from the utilization position towards the assembly position.

The heat shield is thus put into place by sloping the heat shield so as to bring its rear portion to bear against the second abutment and then by causing the heat shield to pivot until it is held parallel to the rim by the elastic means.

Preferably, the heat shield is provided with an elastically deformable nose forming the holder portion, the nose being arranged to retract elastically on contact with the first abutment while the heat shield is pivoting from its assembly position towards its utilization position.

Under such circumstances and advantageously, the wheel includes a third abutment to oppose any movement of each second shield parallel to the bars when the heat shield is in the utilization position and, preferably, the heat shield and the rim are provided with corresponding portions in relief that are mutually engaged when the heat shield is in the utilization position, thereby forming the third abutment.

Thus, the elastically deformable nose serves to hold the heat shield in a direction that is a radial relative to the rim, while the corresponding portions in relief serve to hold the heat shield in a direction that is axial relative to the rim.

According to a particular characteristic, the heat shield is provided with at least one elastically deformable pad bearing against the rim.

This makes it possible to limit the area of the heat shield that is in contact with the rim so as to limit the conduction of heat from the heat shield to the rim. Also, if the elastically deformable pad is compressed while the heat shield is in position, it serves to compensate for assembly clearances.

Other characteristics and advantages of the invention appear on reading the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

With reference to the figures, the invention relates to an aircraft wheel given overall reference 1, and comprising a hub (not shown in figures) connected by a disk 2 to a rim 3 that is to be provided with a tire 100. The rim 3 has an inner surface 4 of cylindrical shape that extends facing an outer surface of the hub in order to co-operate therewith to define an annular space that is to receive a stack of brake disks in conventional manner. Said annular space has one end closed by the disk 2 and an open end enabling the stack of disks to be inserted into the annular space. Wheel splines 5 project from the inner surface 4, and extend parallel to a central axis of the rim 3. These wheel splines 5 are substantially in the shape of rectangular parallelepipeds, each having a first end 5.1 remote from the disk 2, and a second end 5.2 beside the disk 2.

The aircraft wheel 1 has bars 10, each of which is fastened on a respective one of the wheel splines 5. The bars 10 serve in known manner to guide the rotor disks, which disks have axial peripheral notches, each of which receives a segment of a respective one of the bars 10. The bars 10 are arranged to take up the torque between the rotor disks and the wheel splines 5 on the rim 3.

In this example, the bars 10 are trough-shaped, each having a first end 10.1 remote from the disk 2 and a second end 10.2 beside the disk 2. Each bar 10 has two side walls 11 that are connected together by a bottom wall 12. Beside the first end 10.1, the bottom wall 12 is provided with a hole 13 for passing a screw 14 that is engaged in a tapped hole provided in the wheel spline 5 along a radial direction of the rim 3.

The aircraft wheel 1 also has heat shields 20, each mounted between the two bars 10 of a respective pair of adjacent bars 10. The heat shields 20 are in the form of annular segments, each having two main surfaces 21.1 and 21.2 that are curved around an axis that corresponds to the central axis of the wheel 1 when the heat shields 20 are in position in the rim 3. The main surface 21.2 faces towards the inner surface 4 of the rim 3, while the main surface 21.1 faces towards the hub. The main surfaces 21.1 and 21.2 are connected to each other, firstly by two first edges 22 that are opposite each other and parallel to the bars 10, and secondly by two edges 23 (a second edge and a third edge), that are opposite each other, that are curved around said axis, and that extend in a circumferential direction of the rim 3. One of the edges 23, referred to as the "front" edge and referenced 23.1, is in the vicinity of the ends 5.1 of the wheel splines 5, and the other one of the edges 23, referred to as the "rear" edge and referenced 23.2, is in the vicinity of the ends 5.2 of the wheel splines 5 when the heat shield 20 is mounted on the rim 3. Preferably, each heat shield 20 comprises two curved plates that are joined together by the edges 22, 23 and that have outer faces forming the main surfaces 21.1 and 21.2. The main surface 21.2 facing the inner surface 4 of the rim 3 is provided with elastically deformable pads 24 that project from said main surface of 21.2 in order to bear against the inner surface 4 so as to compensate for assembly clearances and avoid transferring heat by conduction from the heat shield 20 to the inner surface 4 of the rim 3.

Each heat shield 20 has portions bearing against the abutments secured to the rim 3 so as to hold the heat shields 20 in position on the rim 3 elastically.

In the first embodiment, and as shown in FIGS. 1 to 6, each bar 10 defines at least one groove portion along each of the two sides of the wheel splines 5 on which it is fitted, each groove portion receiving one of the edges 22 of one of the heat shields 20. More precisely, in this example, each of the side walls 11 has a free edge 15 extending facing the inner surface 4 of the rim 3 and co-operating therewith to define a groove 50 (visible in FIGS. 1 and 6). The groove 50 has an open end defined by a moustache-shaped tab 17 projecting from the first end 10.1 remote from the bottom wall 12 and towards the outside of the bar 10. Each tab 17 has a surface 18 extending parallel to the bottom wall 12 and facing a terminal portion of the edge 15 in order to define an entry passage parallel to the wheel spline 5 for admitting the edge 22 of the heat shield 20 into the groove 50. An abutment 19 (or first abutment) projects from the surface 18 so as to co-operate with the edge 15 to leave a passage for the edge 22 of the heat shield 20.

In the vicinity of the front edge 23.1, the edges 22 of each shield 20 comprise respective raised projections 25 (visible in FIG. 4), that are formed by curving about axes parallel to a circumferential direction of the rim 3, in such a manner that the front edge 23.1 in the vicinity of the raised projections 25 bears against the abutments 19 to oppose extraction of the heat shield 20 from the groove 50 and in such a manner that the raised projection 25 is elastically deformable towards a flattened state in which the front edge 23.1 can escape from the abutment 19. In a rest state, it can be understood that the front edge 23.1 has at least some portions adjacent to the edges 22 that are offset in a direction normal to the main surfaces 21.1, 21.2 relative to the rear edge 23.2. In the flattened state, this offset of the front edge 23.1 relative to the rear edge 23.2 is smaller, or even non-existent.

Remote from the tab 17 defining the open end of the groove 50, the groove 50 has an end that is closed at least in part by a tab 16 of the bar 10 that forms a second abutment in the axial direction for the rear edge 23.2 of the heat shield 20.

It can be understood that assembly the heat shields 20 in the wheel 1 begins by fastening the bars 10. Each bar 10 is placed astride a respective one of the wheel splines 5 and a screw 14 is screwed through each bottom wall 12 into the corresponding wheel spline 5 in order to hold the bar 10 in position.

Each of the heat shields 20 is then engaged between the two bars 10 of each pair of adjacent bars 10. To do this, the two edges 22 are inserted between the tabs 17 into the passage left open by the abutments 19, and the heat shield 20 is slid into the groove 50 until it comes into abutment against the tab 16. During this movement, it is necessary to apply force to deform the raised projection 25 elastically in order to flatten it and cause it to go past the abutment 19. Once the abutment 19 has been passed, the raised projection 25 springs elastically back into shape so that the front edge 23.1 goes behind the abutment 19 thereby opposing any extraction of the heat shield 20 from its housing formed by the bars 10.

Thus, in its utilization position, the heat shield 20 extends between the tab 16 and the abutment 19, which that oppose any axial movement of the heat shield 20, and between the edges 15 and the inner surface 4 of the rim 3, which oppose any radial movement of the heat shield 20.

In the second embodiment, and as shown in FIGS. 7 to 14, the wheel 1 has abutments, each arranged in the vicinity of one of the ends 10.2 of each bar 10, in order to form a bearing surface against which the rear edge 23.2 of the heat shield 20 can bear.

Figure 1:
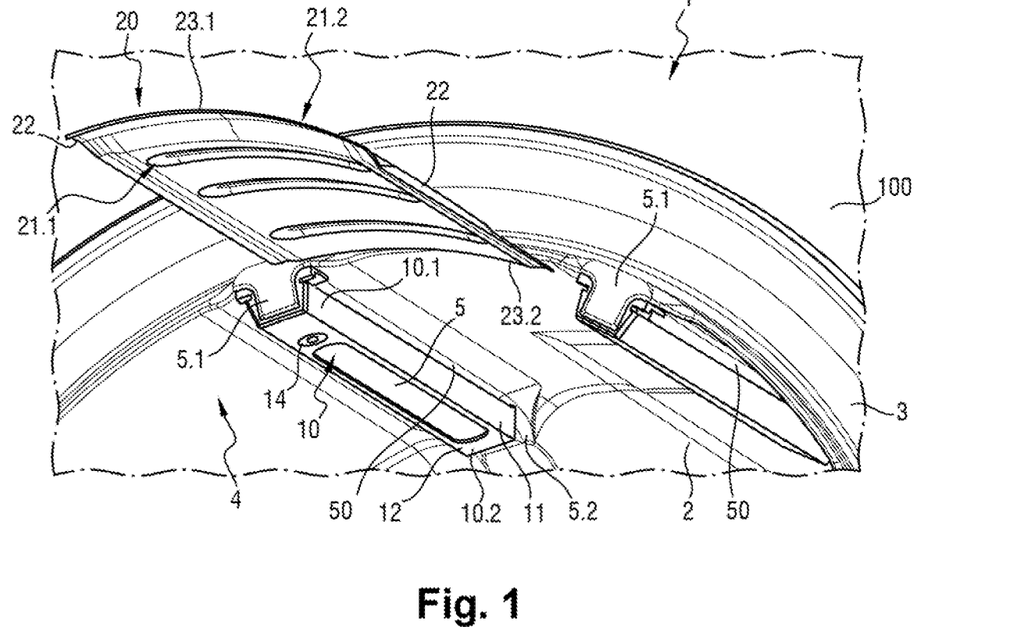
FIG. 1 is a fragmentary perspective view of an aircraft wheel in a first embodiment.
Figure 2:
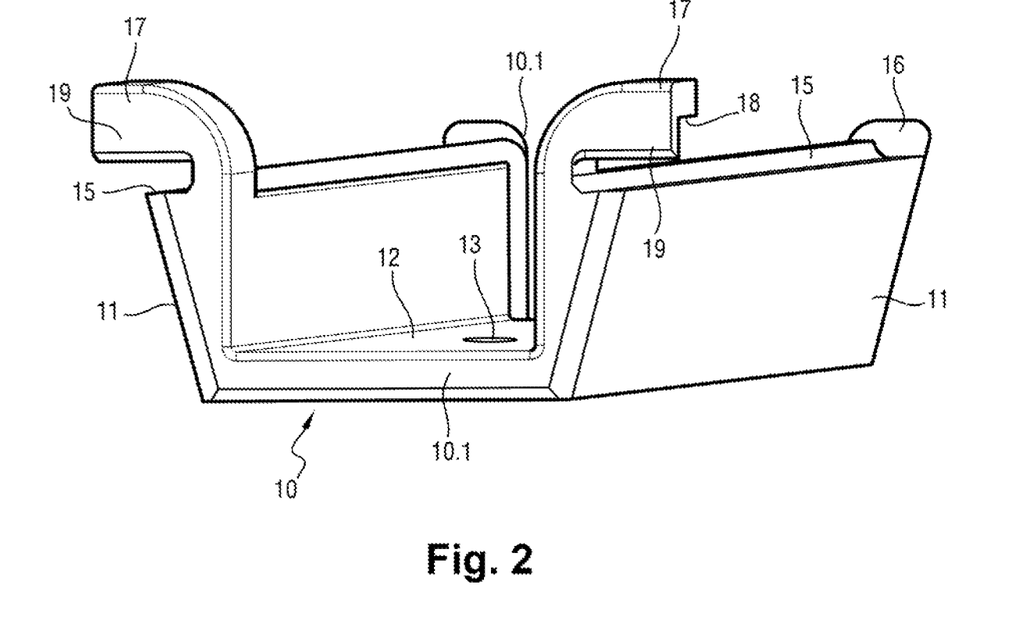
FIG. 2 is a perspective view of one of the bars of said wheel.
Figure 3:
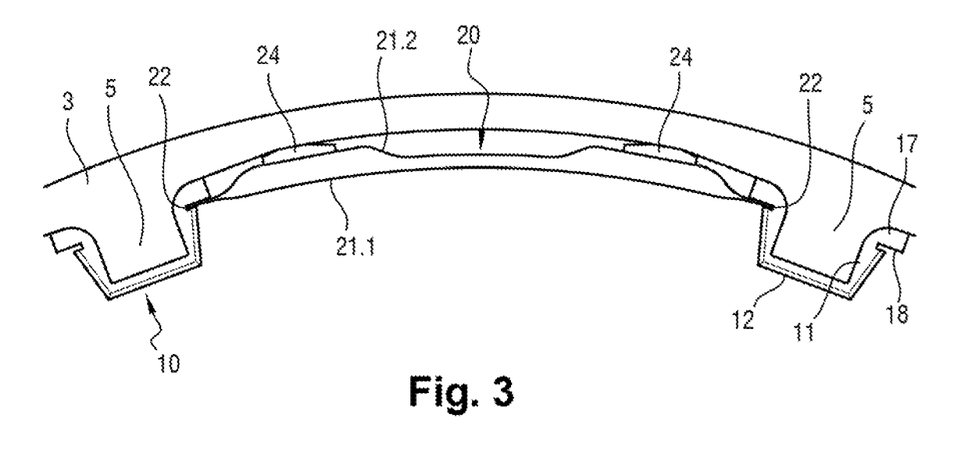
FIG. 3 is a fragmentary view of said wheel in section on a diametral plane of the wheel.
Figure 4:
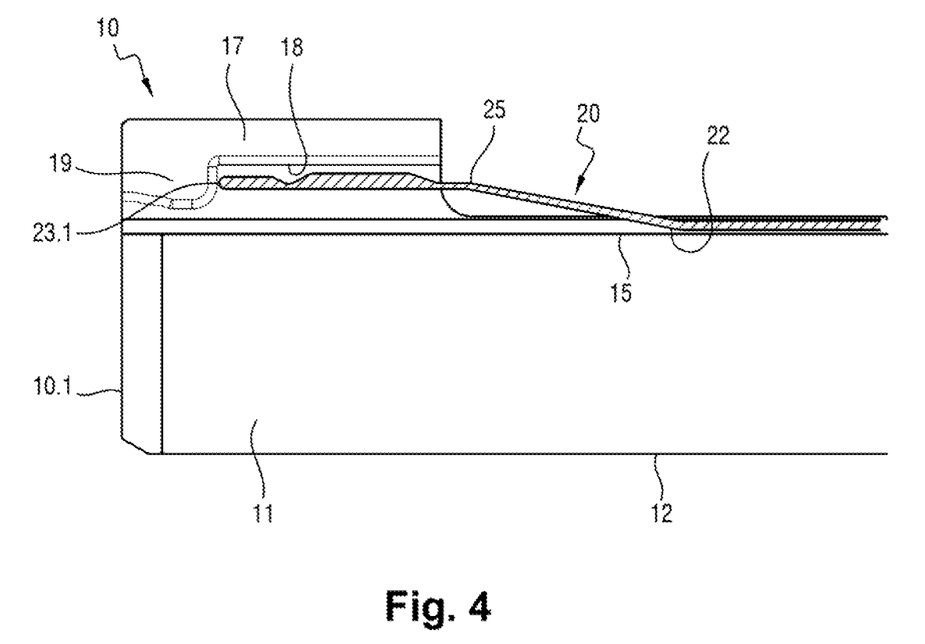
FIG. 4 is a fragmentary side view of one of the bars and of one of the heat shields, the heat shield being shown in longitudinal section.
Figure 5:
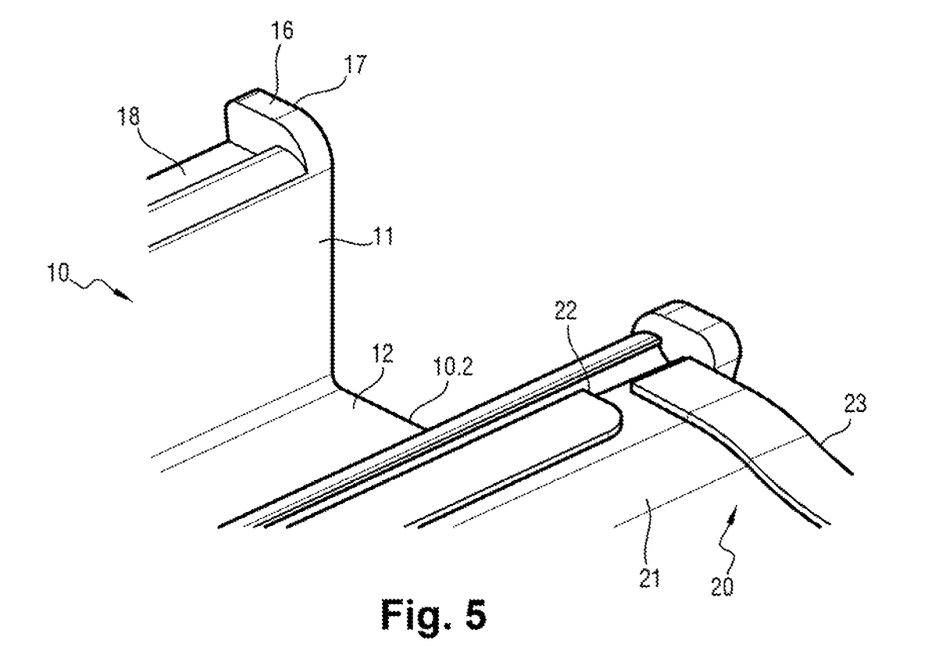
FIG. 5 is a fragmentary perspective view of the inner portion of the bar.
Figure 6:
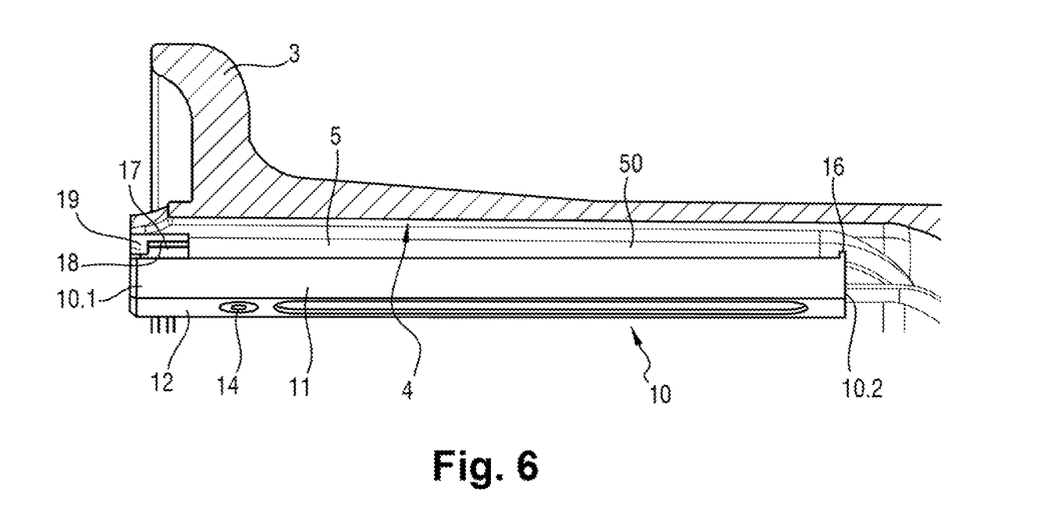
FIG. 6 is a fragmentary view of the wheel in section on an axial plane of the FIG. 1 wheel.
Figure 7:
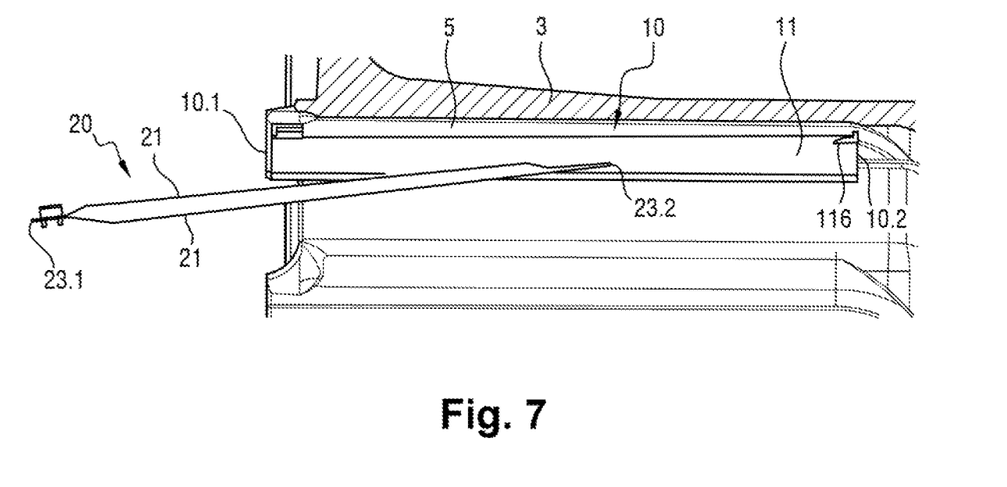
FIG. 7 is a fragmentary view of the wheel in section on an axial plane of the wheel in a second embodiment, which is the preferred embodiment of the invention, when starting to put heat shields into place.
Figure 8:
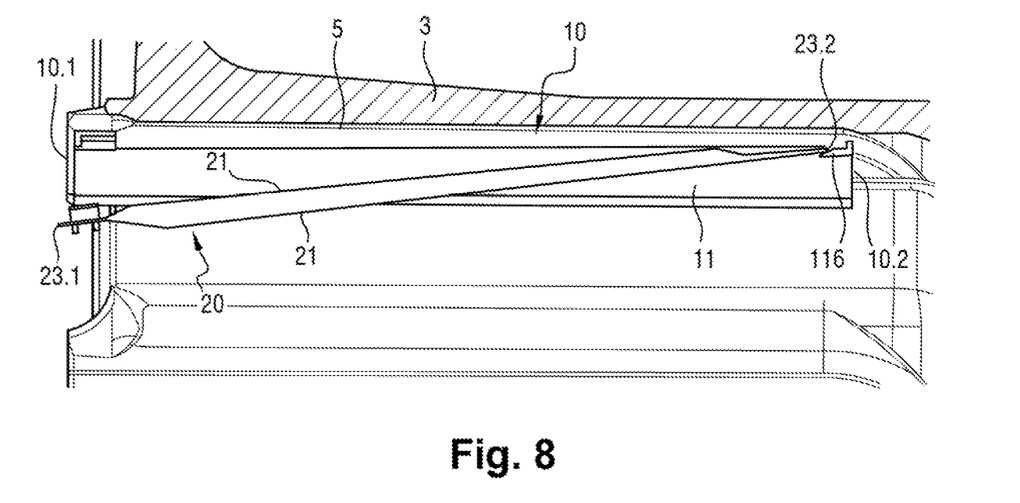
FIG. 8 is a view analogous the view of FIG. 7 showing said wheel while putting the heat shield into place.
Figure 9:
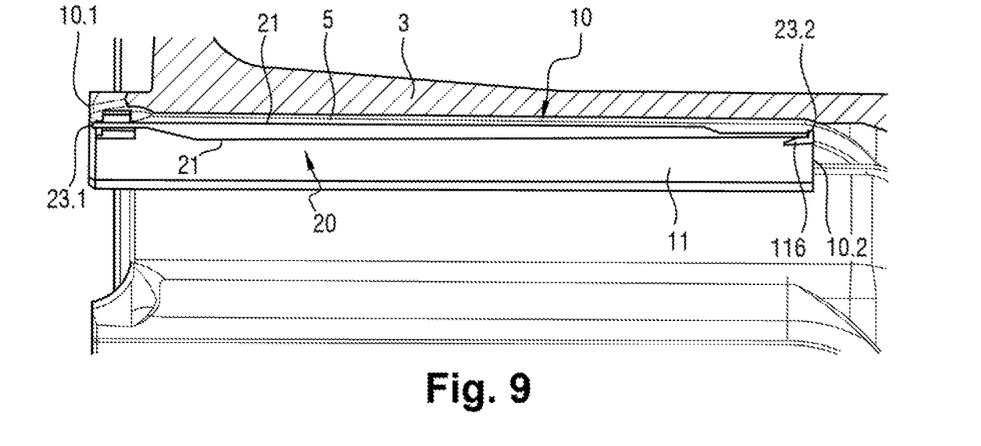
FIG. 9 is a view analogous the view of FIG. 7 showing said wheel at the end of putting the heat shield into place.
Figure 10:
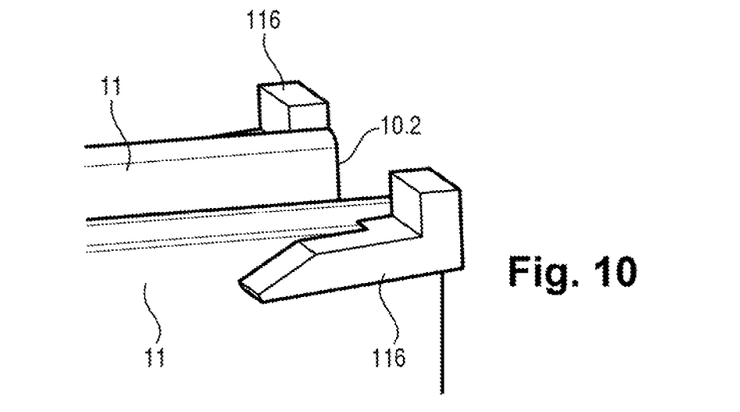
FIG. 10 is a fragmentary perspective view of the rear end of the bar.
Figure 11:
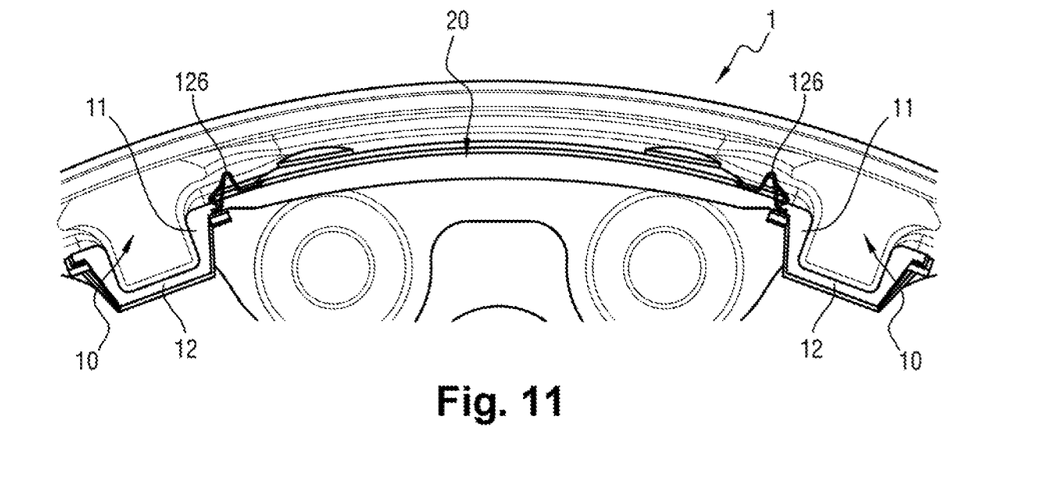
FIG. 11 is a fragmentary front view of the wheel, beside the front ends of the bars.

More precisely, each of said abutments is formed by a tab 116 (or second abutment) that projects from the edge 15 of the end 10.2 and that is curved towards the end 10.1. Each tab 116 is arranged to allow the front edge 23.1 of the heat shield 20 to pivot between an assembly position in which the heat shield 20 slopes relative to the rim 3 (FIG. 8), and a utilization position in which the heat shield 20 extends parallel to the rim 3 (FIG. 9).

Figure 12:
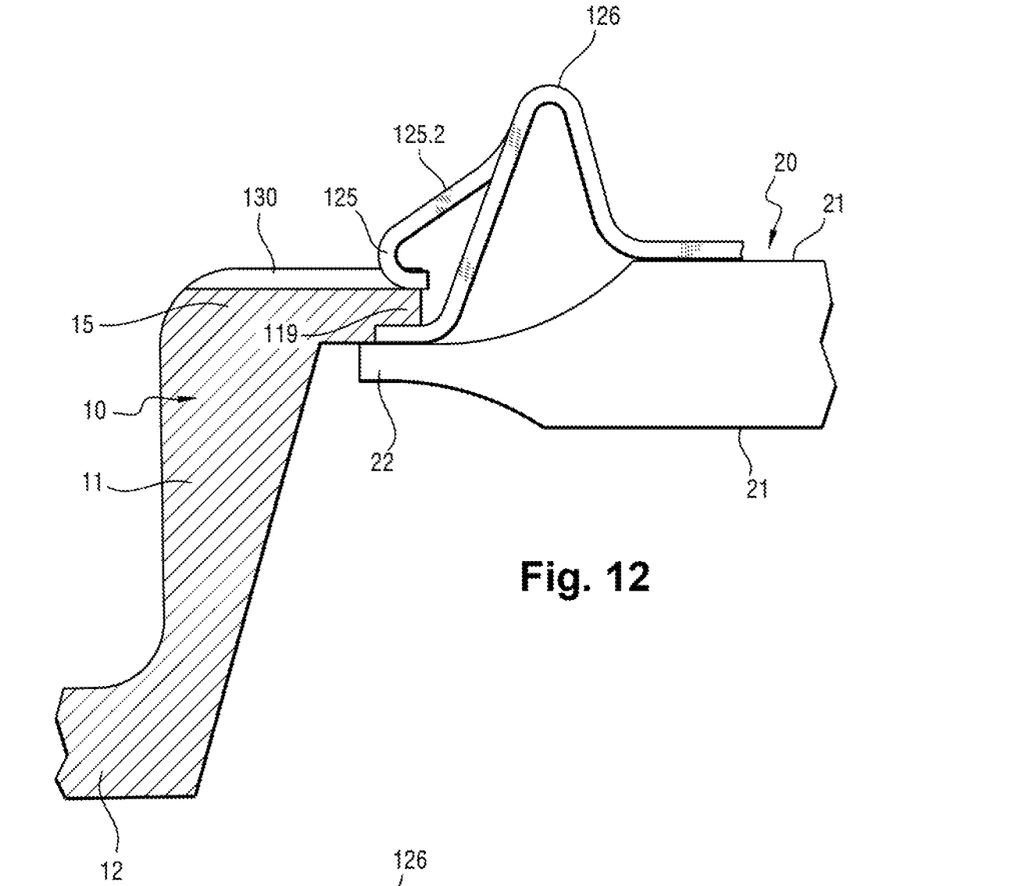
FIG. 12 is a side view in partial section of a heat shield fastener clip in the second embodiment.
Figure 13:
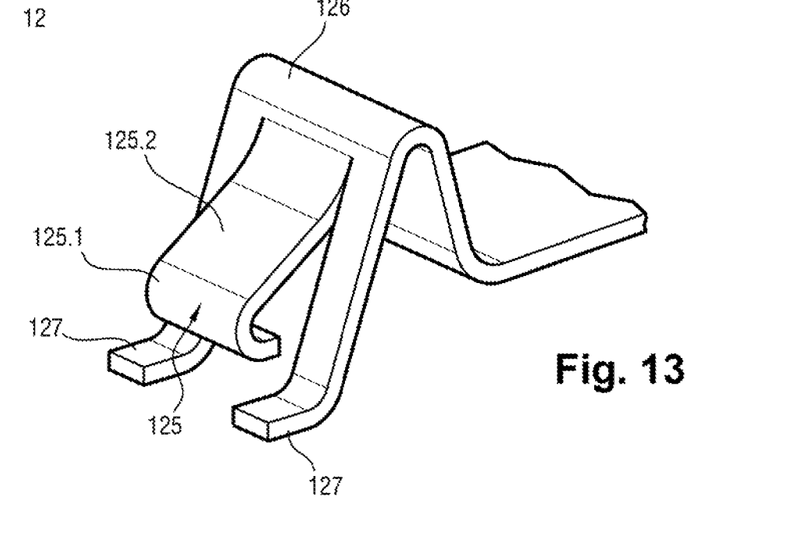
FIG. 13 is a perspective view of the heat shield fastener clip.

Each heat shield 20 is provided with an elastically deformable nose 125, shown in FIGS. 12 and 13, forming the holder portion for co-operating with a tab 119 (forming the first abutment in this embodiment) extending from the free edge 15 of each side wall 11 and projecting sideways towards the outside of each bar 10. In this example, the nose 125 is formed by a tongue cut out in a triangular clip 126 having a base that is fastened on the surface 21.2 facing towards the inner surface 4 of the rim 3. The nose 125 is arranged to retract elastically on coming into contact with the tab 119 while the heat shield 20 is pivoting from its assembly position towards its utilization position, and to oppose pivoting of the heat shield 20 from its utilization position towards its assembly position. For this purpose and in this example, the nose 125 has a curved terminal portion 125.1 for bearing against a rear face of the tab 119 while the heat shield 20 is in its utilization position (FIG. 12), and a sloping portion 125.2 connecting with the clip 126 and forming a ramp on which a front face of the tab 119 comes to bear and slide during pivoting of the heat shield 20 from its assembly position to its utilization position, thereby causing the nose 125 to deform elastically until it allows the tab 119 to go past.

The wheel 1 has third abutments for opposing any movement of each heat shield 20 parallel to the wheel splines 5 while the heat shield 20 is in its utilization position. For this purpose, each heat shield 20 and each bar 10 is provided with corresponding portions in relief that are mutually engaged when the heat shield 20 is in its utilization position.

More precisely in this example, when the heat shield 20 is in its utilization position, the curved terminal portion 125.1 of the nose 125 is received between two portions in relief 130 projecting from the rear face of the tab 119 (only one portion in relief 130 can be seen in FIG. 12).

In a variant, it is possible to provide one portion in relief on the front face of the tab 119 so that said portion in relief is received between two arms 127 of the clip 126 extending on either side of the nose 125.

Naturally, the invention is not limited to the embodiment described, but covers any variant coming within the ambit of the invention as defined by the claims.

In particular, the structure and the shape of the bar 10 and/or the structure and the shape of the heat shield 20 may be different from those described and/or shown. The term "bar" is used to designate any element that may be integral with the rim or that may be fitted thereto and that serves in particular to transmit force between the disks and the rim. Likewise, the wheel splines may be of a shape that is different from that described and they may be integral with the rim or they may be fitted thereto. A bar and a wheel spline may comprise a single part.

Some or all of the abutments may be constituted by portions in relief on the rim 3, including the wheel splines 5. Thus, although in the embodiment described, the abutment 19 is formed by a tab on the bar 10, the abutment could be formed by a projection from the rim 3. The same applies to the abutments 16, 116, and 119. Nevertheless, it is more advantageous to provide these abutments on the bars 10, since that limits contacts between the heat shields 20 and the rim 3, and thus limits heat transfer by conduction.

The heat shields 20 may be fastened by more than two clips 126, e.g. by four clips arranged at the four corners of each shield 20, with the two edges 23 of the heat shield 20 then being moved towards the inner surface 4 of the rim 3 in directions that are substantially radial relative to the rim 3.

Although in this example each shield 20 is fastened by identical means on both sides of the heat shield 20, it is possible to use different means. By way of example, the heat shield may have one edge 22 received in a groove formed along the bar 10 on the right, and another edge 22 provided with clips 126 for co-operating with the abutments 119 arranged on the bar 10 on the left. It is also possible, by way of example, to combine the fastener means of both embodiments with a single rim 3.

Although, in the embodiments described, the bar 10 co-operates with a portion of the rim 3 to define the groove 50, which groove 50 could be formed entirely in the bar 10 by grooving each of the side walls 11.

Each heat shield 20 could be provided with one or more elastically deformable pads 24 bearing against the rim 3, or it need not have any. Under such circumstances, the radial positioning means of the heat shields 20 should be positioned in such a manner as to be spaced apart from the inner surface of the rim 3 in order to limit heat transfer by conduction.

In addition, the presence of a third abutment may be associated with corresponding portions in relief for opposing any movement of each heat shield 20 parallel to the bars 10.

The rim 3 may comprise one or more portions.

The invention claimed is:

1. An aircraft wheel comprising a hub connected to a rim provided with a tire, the hub having an outer surface that extends facing an inner surface of the rim and that co-operates therewith to define an annular space for receiving a stack of brake disks including rotor disks having axial peripheral notches, each axial peripheral notch receiving a segment of an axial bar extending projecting from the inner surface of the rim, and respective heat shields, each in the form of an annular segment, being mounted between two axial bars of respective pairs of adjacent axial bars,
   wherein each heat shield includes at least one holder portion bearing against at least one first abutment secured to the rim in order to hold the heat shield in position on the rim elastically, and the at least one holder portion and the at least one first abutment are arranged to be put into engagement substantially radially relative to the rim.

2. The aircraft wheel according to claim 1, including a third abutment to oppose any movement of each shield parallel to the axial bars when the heat shield is in the utilization position.

3. The aircraft wheel according to claim 2, wherein the heat shield and the rim are provided with corresponding portions in relief that are mutually engaged when the heat shield is in the utilization position, thereby forming the third abutment.

4. The aircraft wheel according to claim 1, including second abutments, each arranged in a vicinity of one of ends of each axial bar remote from the at least one first abutment and on at least one side of said axial bar in order to form a bearing surface against which edge of the heat shield can bear.

5. The aircraft wheel according to claim 1, wherein the at least one first abutment is secured to the axial bar.

6. The aircraft wheel according to claim 1, wherein the heat shield is provided with at least one elastically deformable pad bearing against the rim.

7. An aircraft wheel comprising a hub connected to a rim provided with a tire, the hub having an outer surface that extends facing an inner surface of the rim and that co-operates therewith to define an annular space for receiving a stack of brake disks including rotor disks having axial peripheral notches each notch receiving a segment of an axial bar extending projecting from the inner surface of the rim, and respective heat shields, each in the form of annular segment, being mounted between the two bars of respective pairs of adjacent bars, the heat shields having first edges that are opposite each other and parallel to the bars,
   wherein each heat shield includes at least one holder portion bearing against at least one first abutment secured to the rim in order to hold the heat shield in position on the rim elastically and the holder portion and the first abutment are arranged to be put into engagement substantially radially relative to the rim,
   wherein the aircraft wheel includes second abutments, each arranged in the vicinity of one of the ends of each bar remote from the first abutment and on at least one side of said bar in order to form a bearing surface against which a second edge of the heat shield can bear, and
   wherein each second abutment is arranged to allow a third edge of the heat shield that is remote from the second edge to pivot between an assembly position in which the heat shield slopes relative to the rim and a utilization position in which the heat shield extends parallel to the rim and its holder portion co-operating with the first abutment, the at least one holder portion and the at least one first abutment being arranged to allow the heat shield to pivot from the assembly position towards the utilization position and to oppose pivoting of the heat shield from the utilization position towards the assembly position.

8. The aircraft wheel according to claim 7, wherein the heat shield is provided with an elastically deformable nose forming the holder portion, the elastically deformable nose being arranged to retract elastically on contact with the at least one first abutment while the heat shield is pivoting from its assembly position towards its utilization position.

9. The aircraft wheel according to claim 8, wherein the elastically deformable nose is secured to a clip fitted on the heat shield.

10. The aircraft wheel according to claim 9, wherein the clip and the rim carry corresponding portions in relief that are mutually engaged when the heat shield is in the utilization position so as to oppose any movement of each heat shield parallel to the axial bars.

\* \* \* \* \*